(12) United States Patent
Lin

(10) Patent No.: US 12,189,421 B2
(45) Date of Patent: *Jan. 7, 2025

(54) EYEWEAR WITH CONDUCTIVE TEMPLE JOINT

(71) Applicant: Snap Inc., Santa Monica, CA (US)

(72) Inventor: Jun Lin, Sherman Oaks, CA (US)

(73) Assignee: Snap Inc., Santa Monica, CA (US)

( * ) Notice: Subject to any disclaimer, the term of this patent is extended or adjusted under 35 U.S.C. 154(b) by 569 days.

This patent is subject to a terminal disclaimer.

(21) Appl. No.: 17/453,422

(22) Filed: Nov. 3, 2021

(65) Prior Publication Data

US 2022/0057830 A1 Feb. 24, 2022

Related U.S. Application Data

(63) Continuation of application No. 16/790,971, filed on Feb. 14, 2020, now Pat. No. 11,188,123, which is a (Continued)

(51) Int. Cl.
*G02C 5/14* (2006.01)
*G02C 11/00* (2006.01)
*G06F 1/16* (2006.01)

(52) U.S. Cl.
CPC ............... *G06F 1/163* (2013.01); *G02C 5/14* (2013.01); *G02C 11/10* (2013.01); *G06F 1/1635* (2013.01)

(58) Field of Classification Search
None
See application file for complete search history.

(56) References Cited

U.S. PATENT DOCUMENTS

| | | |
|---|---|---|
| 2,794,085 A | 5/1957 | Angelis |
| 4,456,346 A | 6/1984 | Beyer |
| | (Continued) | |

FOREIGN PATENT DOCUMENTS

| | | |
|---|---|---|
| CA | 2887596 A1 | 7/2015 |
| EP | 2596716 A1 | 5/2013 |
| | (Continued) | |

OTHER PUBLICATIONS

"U.S. Appl. No. 18/047,229, Preliminary Amendment filed Oct. 31, 2022", 7 pgs.

(Continued)

*Primary Examiner* — Darryl J Collins
(74) *Attorney, Agent, or Firm* — Schwegman Lundberg & Woessner, P.A.

(57) ABSTRACT

Apparatuses and systems for wearable devices such as eyewear are described. According to one embodiment, the wearable device includes a frame, a temple, onboard electronics components, and a coupling mechanism. The frame is configured to hold one or more optical elements. The temple is connected to the frame at an articulated joint such that the temple is disposable between a collapsed condition and a wearable condition in which the device is wearable by a user to hold the one or more optical elements within user view. The onboard electronics components comprise at least a pair of electronics components carried by the frame and the temple respectively. The coupling mechanism is incorporated in the articulated joint and that is configured to electrically connect the pair of electronics components across the articulated joint both when the temple is in the wearable condition and when the temple is in the collapsed condition.

18 Claims, 11 Drawing Sheets

Related U.S. Application Data continuation of application No. 15/949,852, filed on Apr. 10, 2018, now Pat. No. 10,591,745, which is a continuation of application No. 15/642,878, filed on Jul. 6, 2017, now Pat. No. 9,971,169, which is a continuation of application No. 14/869,149, filed on Sep. 29, 2015, now Pat. No. 9,726,904.

(56) References Cited

U.S. PATENT DOCUMENTS

| | | | |
|---|---|---|---|
| 5,258,784 | A | 11/1993 | Baines |
| 5,606,743 | A | 2/1997 | Vogt et al. |
| 5,900,720 | A | 5/1999 | Kallman et al. |
| 5,946,071 | A * | 8/1999 | Feldman ............ G02C 11/04 351/158 |
| 6,038,295 | A | 3/2000 | Mattes |
| 6,091,546 | A | 7/2000 | Spitzer |
| 6,409,338 | B1 * | 6/2002 | Jewell ............ G02C 11/10 351/158 |
| 6,854,845 | B1 | 2/2005 | Goldman et al. |
| 6,980,909 | B2 | 12/2005 | Root et al. |
| 7,173,651 | B1 | 2/2007 | Knowles |
| 7,376,238 | B1 * | 5/2008 | Rivas ............ A61B 5/0205 381/381 |
| 7,411,493 | B2 | 8/2008 | Smith |
| 7,470,023 | B2 | 12/2008 | Glinert |
| 7,535,890 | B2 | 5/2009 | Rojas |
| 7,677,723 | B2 | 3/2010 | Howell et al. |
| 7,808,449 | B2 | 10/2010 | Neidrich et al. |
| 7,946,705 | B1 | 5/2011 | Hsu |
| 8,131,597 | B2 | 3/2012 | Hudetz |
| 8,199,747 | B2 | 6/2012 | Rojas et al. |
| 8,332,475 | B2 | 12/2012 | Rosen et al. |
| 8,432,124 | B2 | 4/2013 | Foster |
| 8,678,581 | B2 | 3/2014 | Blum |
| 8,718,333 | B2 | 5/2014 | Wolf et al. |
| 8,724,622 | B2 | 5/2014 | Rojas |
| 8,874,677 | B2 | 10/2014 | Rosen et al. |
| 8,909,679 | B2 | 12/2014 | Root et al. |
| 8,979,259 | B2 | 3/2015 | Haddock et al. |
| 8,985,320 | B2 | 3/2015 | Santarelli |
| 8,995,433 | B2 | 3/2015 | Rojas |
| 9,040,574 | B2 | 5/2015 | Wang et al. |
| 9,055,416 | B2 | 6/2015 | Rosen et al. |
| 9,100,806 | B2 | 8/2015 | Rosen et al. |
| 9,100,807 | B2 | 8/2015 | Rosen et al. |
| 9,191,776 | B2 | 11/2015 | Root et al. |
| 9,204,252 | B2 | 12/2015 | Root |
| 9,443,227 | B2 | 9/2016 | Evans et al. |
| 9,482,882 | B1 | 11/2016 | Hanover et al. |
| 9,482,883 | B1 | 11/2016 | Meisenholder |
| 9,489,661 | B2 | 11/2016 | Evans et al. |
| 9,491,134 | B2 | 11/2016 | Rosen et al. |
| 9,726,904 | B1 | 8/2017 | Lin |
| 9,740,023 | B1 | 8/2017 | Ashwood |
| 9,952,452 | B1 | 4/2018 | Hanover et al. |
| 9,971,169 | B1 | 5/2018 | Lin |
| 10,514,559 | B1 | 12/2019 | Meisenholder |
| 10,591,745 | B1 | 3/2020 | Lin |
| 10,670,889 | B1 | 6/2020 | Hanover et al. |
| 10,993,515 | B1 | 5/2021 | Kim et al. |
| 11,188,123 | B1 | 11/2021 | Lin |
| 11,219,287 | B1 | 1/2022 | Kim et al. |
| 11,300,814 | B1 | 4/2022 | Meisenholder |
| 11,470,936 | B2 | 10/2022 | Kim et al. |
| 11,600,945 | B2 | 3/2023 | Hanover et al. |
| 11,659,908 | B2 | 5/2023 | Kim et al. |
| 11,825,923 | B2 | 11/2023 | Kim et al. |
| 11,973,292 | B2 | 4/2024 | Hanover et al. |
| 2005/0242771 | A1 | 11/2005 | Blum et al. |
| 2007/0132942 | A1 | 6/2007 | Zelazowski |
| 2008/0106694 | A1 | 5/2008 | Blum et al. |
| 2008/0129953 | A1 | 6/2008 | Blum et al. |
| 2009/0002626 | A1 | 1/2009 | Wakabayashi |
| 2009/0182688 | A1 | 7/2009 | Van Der Zwan et al. |
| 2009/0195747 | A1 | 8/2009 | Insua |
| 2009/0251660 | A1 | 10/2009 | Figler et al. |
| 2009/0296044 | A1 | 12/2009 | Howell et al. |
| 2010/0177277 | A1 | 7/2010 | Kokonaski et al. |
| 2010/0294675 | A1 | 11/2010 | Mangano |
| 2011/0058141 | A1 | 3/2011 | Cozzani |
| 2011/0075095 | A1 | 3/2011 | Waters |
| 2011/0102734 | A1 * | 5/2011 | Howell ............ G02C 5/14 351/158 |
| 2011/0181238 | A1 | 7/2011 | Soar |
| 2011/0202598 | A1 | 8/2011 | Evans et al. |
| 2012/0155064 | A1 | 6/2012 | Waters |
| 2012/0176580 | A1 | 7/2012 | Sonsino |
| 2012/0203310 | A1 | 8/2012 | Pugh et al. |
| 2012/0209924 | A1 | 8/2012 | Evans et al. |
| 2012/0220224 | A1 | 8/2012 | Abreu |
| 2013/0164949 | A1 | 6/2013 | Riering-Czekalla et al. |
| 2014/0305814 | A1 | 10/2014 | Santarelli |
| 2015/0200554 | A1 | 7/2015 | Marks et al. |
| 2015/0230988 | A1 * | 8/2015 | Chao ............ G02C 7/104 349/13 |
| 2018/0090958 | A1 | 3/2018 | Steger et al. |
| 2018/0136491 | A1 | 5/2018 | Ashwood et al. |
| 2020/0241329 | A1 | 7/2020 | Hanover et al. |
| 2021/0298440 | A1 | 9/2021 | Kim et al. |
| 2022/0151356 | A1 | 5/2022 | Kim et al. |
| 2023/0054967 | A1 | 2/2023 | Kim et al. |
| 2023/0187875 | A1 | 6/2023 | Hanover et al. |
| 2023/0248130 | A1 | 8/2023 | Kim et al. |
| 2024/0081500 | A1 | 3/2024 | Kim et al. |
| 2024/0235109 | A1 | 7/2024 | Hanover et al. |

FOREIGN PATENT DOCUMENTS

| | | |
|---|---|---|
| FR | 2114282 | 6/1972 |
| GB | 384198 | 12/1932 |
| WO | WO-2013103985 A2 | 7/2013 |

OTHER PUBLICATIONS

"U.S. Appl. No. 16/853,501, Notice of Allowance mailed Nov. 4, 2022", 9 pgs.

"U.S. Appl. No. 17/535,158, Non Final Office Action mailed Nov. 10, 2022", 15 pgs.

"U.S. Appl. No. 17/535,158, Response filed Dec. 13, 2022 to Non Final Office Action mailed Nov. 10, 2022", 8 pgs.

"U.S. Appl. No. 17/535,158, Notice of Allowance mailed Jan. 19, 2023", 8 pgs.

"U.S. Appl. No. 18/047,229, Non Final Office Action mailed Feb. 8, 2023", 9 pgs.

"U.S. Appl. No. 18/047,229, Response filed Mar. 2, 2023 to Non Final Office Action mailed Feb. 8, 2023", 11 pgs.

"U.S. Appl. No. 18/047,229, Final Office Action mailed Mar. 15, 2023", 9 pgs.

"U.S. Appl. No. 18/047,229, Response filed Mar. 28, 2023 to Final Office Action mailed Mar. 15, 2023", 9 pgs.

"U.S. Appl. No. 18/047,229, Advisory Action mailed Apr. 11, 2023", 3 pgs.

"U.S. Appl. No. 17/535,158, Supplemental Notice of Allowability mailed May 1, 2023", 2 pgs.

"U.S. Appl. No. 18/107,355, Non Final Office Action mailed Jul. 3, 2023", 21 pgs.

"U.S. Appl. No. 18/047,229, Notice of Allowance mailed Jul. 19, 2023", 7 pgs.

"U.S. Appl. No. 18/107,355, Response filed Oct. 3, 2023 to Non Final Office Action mailed Jul. 3, 2023", 12 pgs.

"U.S. Appl. No. 18/107,355, Final Office Action mailed Oct. 16, 2023", 12 pgs.

"Amendment and Response to Non Final Office Action: U.S. Appl. No. 15/339,526, Response filed Jun. 13, 2017 to Non Final Office Action mailed Mar. 13, 2017", 13 pgs.

"U.S. Appl. No. 14/687,308, Final Office Action mailed Feb. 1, 2016", 12 pgs.

"U.S. Appl. No. 14/687,308, Non Final Office Action mailed May 29, 2015", 9 pgs.

(56) References Cited

OTHER PUBLICATIONS

"U.S. Appl. No. 14/687,308, Notice of Allowance mailed Aug. 3, 2016", 13 pgs.
"U.S. Appl. No. 14/687,308, Response filed Jun. 24, 2016 to Final Office Action mailed Feb. 1, 2016", 18 pgs.
"U.S. Appl. No. 14/687,308, Response filed Oct. 28, 2015 to Non Final Office Action mailed May 29, 2015", 20 pgs.
"U.S. Appl. No. 14/687,362, Non Final Office Action mailed Jan. 6, 2016", 8 pgs.
"U.S. Appl. No. 14/687,362, Non Final Office Action mailed May 29, 2015", 7 pgs.
"U.S. Appl. No. 14/687,362, Notice of Allowance mailed Sep. 6, 2016", 7 pgs.
"U.S. Appl. No. 14/687,362, Response filed Jun. 3, 2016 to Non Final Office Action mailed Jan. 6, 2016", 14 pgs.
"U.S. Appl. No. 14/687,362, Response filed Oct. 28, 2015 to Non Final Office Action mailed May 29, 2015", 16 pgs.
"U.S. Appl. No. 14/869,149 Amendment and Response filed Mar. 16, 2017 to Non Final Office Action mailed Dec. 5, 2016", 20 pgs.
"U.S. Appl. No. 14/869,149, Corrected Notice of Allowance mailed Apr. 17, 2017", 2 pgs.
"U.S. Appl. No. 14/869,149, Non Final Office Action mailed Dec. 5, 2016", 14 pgs.
"U.S. Appl. No. 14/869,149, Notice of Allowance mailed Mar. 24, 2017", 7 pgs.
"U.S. Appl. No. 14/869,149, PTO Response to Rule 312 Communication mailed Jun. 29, 2017", 2 pgs.
"U.S. Appl. No. 15/339,526, Final Office Action mailed Sep. 14, 2017", 11 pgs.
"U.S. Appl. No. 15/339,526, Non Final Office Action mailed Mar. 13, 2017", 6 pgs.
"U.S. Appl. No. 15/339,526, Notice of Allowance mailed Dec. 11, 2017", 18 pgs.
"U.S. Appl. No. 15/339,526, Response filed Nov. 13, 2017 to Final Office Action mailed Sep. 14, 2017", 8 pgs.
"U.S. Appl. No. 15/339,537, Advisory Action mailed Feb. 5, 2018", 3 pgs.
"U.S. Appl. No. 15/339,537, Advisory Action mailed Jun. 26, 2019", 3 pgs.
"U.S. Appl. No. 15/339,537, Corrected Notice of Allowability mailed Nov. 13, 2019", 2 pgs.
"U.S. Appl. No. 15/339,537, Final Office Action mailed Mar. 22, 2019", 13 pgs.
"U.S. Appl. No. 15/339,537, Final Office Action mailed Nov. 17, 2017", 13 pgs.
"U.S. Appl. No. 15/339,537, Non Final Office Action mailed Mar. 14, 2017", 5 pgs.
"U.S. Appl. No. 15/339,537, Non Final Office Action mailed Aug. 10, 2018", 13 pgs.
"U.S. Appl. No. 15/339,537, Notice of Allowance mailed Aug. 26, 2019", 7 pgs.
"U.S. Appl. No. 15/339,537, Response filed Jan. 17, 2018 to Final Office Action mailed Nov. 17, 2017", 12 pgs.
"U.S. Appl. No. 15/339,537, Response filed May 20, 2019 to Final Office Action mailed Mar. 22, 2019", 14 pgs.
"U.S. Appl. No. 15/339,537, Response filed Jul. 18, 2017 to Non Final Office Action mailed Mar. 14, 2017", 11 pgs.
"U.S. Appl. No. 15/339,537, Response filed Nov. 8, 2018 to Non Final Office Action mailed Aug. 10, 2018", 16 pgs.
"U.S. Appl. No. 15/642,878, Non Final Office Action mailed Sep. 18, 2017", 12 pgs.
"U.S. Appl. No. 15/642,878, Notice of Allowance mailed Jan. 22, 2018", 11 pgs.
"U.S. Appl. No. 15/642,878, Response filed Dec. 8, 2017 to Non Final Office Action mailed Sep. 18, 2017", 17 pgs.
"U.S. Appl. No. 15/892,610, Non Final Office Action mailed Sep. 13, 2019", 11 pgs.
"U.S. Appl. No. 15/892,610, Notice of Allowance mailed Jan. 24, 2020", 8 pgs.
"U.S. Appl. No. 15/892,610, Response filed Dec. 12, 2019 to Non Final Office Action mailed Sep. 13, 2019", 10 pgs.
"U.S. Appl. No. 15/892,610, Response filed Jun. 21, 2019 to Restriction Requirement mailed Apr. 25, 2019", 7 pgs.
"U.S. Appl. No. 15/892,610, Restriction Requirement mailed Apr. 25, 2019", 6 pgs.
"U.S. Appl. No. 15/949,852, Non Final Office Action mailed Jul. 25, 2019", 5 pgs.
"U.S. Appl. No. 15/949,852, Notice of Allowance mailed Nov. 6, 2019", 7 pgs.
"U.S. Appl. No. 15/949,852, Response filed Oct. 24, 2019 to Non-Final Office Action mailed Jul. 25, 2019", 8 pgs.
"U.S. Appl. No. 16/115,273, Final Office Action mailed Dec. 10, 2020", 13 pgs.
"U.S. Appl. No. 16/115,273, Non Final Office Action mailed Apr. 1, 2021", 12 pgs.
"U.S. Appl. No. 16/115,273, Non Final Office Action mailed Apr. 30, 2020", 11 pgs.
"U.S. Appl. No. 16/115,273, Notice of Allowance mailed Aug. 17, 2021", 7 pgs.
"U.S. Appl. No. 16/115,273, Response filed Mar. 10, 2021 to Final Office Action mailed Dec. 10, 2020", 10pgs.
"U.S. Appl. No. 16/115,273, Response filed Jun. 18, 2021 to Non Final Office Action mailed Apr. 1, 2021", 10 pgs.
"U.S. Appl. No. 16/115,273, Response filed Aug. 31, 2020 to Non Final Office Action mailed Apr. 30, 2020", 11 pgs.
"U.S. Appl. No. 16/115,273, Supplemental Notice of Allowability mailed Aug. 27, 2021", 2 pgs.
"U.S. Appl. No. 16/115,286, Examiner Interview Summary mailed Jul. 20, 2020", 3 pgs.
"U.S. Appl. No. 16/115,286, Final Office Action mailed Sep. 14, 2020", 11 pgs.
"U.S. Appl. No. 16/115,286, Non Final Office Action mailed May 4, 2020", 14 pgs.
"U.S. Appl. No. 16/115,286, Notice of Allowance mailed Jan. 6, 2021", 7 pgs.
"U.S. Appl. No. 16/115,286, Response filed Apr. 21, 2020 to Restriction Requirement mailed Jan. 21, 2020", 9 pgs.
"U.S. Appl. No. 16/115,286, Response filed Aug. 4, 2020 to Non Final Office Action mailed May 4, 2020", 13 pgs.
"U.S. Appl. No. 16/115,286, Response filed Dec. 14, 2020 to Final Office Action mailed Sep. 14, 2020", 8 pgs.
"U.S. Appl. No. 16/115,286, Restriction Requirement mailed Jan. 21, 2020", 8 pgs.
"U.S. Appl. No. 16/790,971, 312 Amendment filed Oct. 14, 2021", 5 pgs.
"U.S. Appl. No. 16/790,971, Corrected Notice of Allowability mailed Aug. 9, 2021", 2 pgs.
"U.S. Appl. No. 16/790,971, Non Final Office Action mailed Apr. 19, 2021", 11 pgs.
"U.S. Appl. No. 16/790,971, Notice of Allowance mailed Jul. 27, 2021", 5 pgs.
"U.S. Appl. No. 16/790,971, Preliminary Amendment filed Mar. 30, 2020", 6 pgs.
"U.S. Appl. No. 16/790,971, PTO Response to Rule 312 Communication mailed Oct. 28, 2021", 2 pgs.
"U.S. Appl. No. 16/790,971, Response filed Jul. 14, 2021 to Non Final Office Action mailed Apr. 19, 2021", 12 pgs.
"U.S. Appl. No. 17/301,738, Preliminary Amendment filed Jun. 17, 2021", 8 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
"U.S. Appl. No. 16/696,499, Notice of Allowance mailed Dec. 15, 2021", 9 pgs.
"U.S. Appl. No. 16/696,499, Corrected Notice of Allowability mailed Dec. 30, 2021", 2 pgs.
"U.S. Appl. No. 17/535,158, Preliminary Amendment filed Feb. 8, 2022", 7 pgs.
"U.S. Appl. No. 16/853,501, Non Final Office Action mailed Jun. 9, 2022", 17 pgs.
"U.S. Appl. No. 17/301,738, Notice of Allowance mailed Jun. 15, 2022", 8 pgs.

(56) References Cited

OTHER PUBLICATIONS

"U.S. Appl. No. 17/301,738, Corrected Notice of Allowability mailed Jun. 29, 2022", 2 pgs.
"U.S. Appl. No. 16/853,501, Response filed Sep. 7, 2022 to Non Final Office Action mailed Jun. 9, 2022", 11 pgs.
U.S. Appl. No. 17/535,158, filed Nov. 24, 2021, Eyewear Device Charging Case.
"U.S. Appl. No. 18/047,229, Corrected Notice of Allowability mailed Oct. 26, 2023", 2 pgs.
"U.S. Appl. No. 18/107,355, Notice of Allowance mailed Jan. 10, 2024", 9 pgs.
"U.S. Appl. No. 18/107,355, Response filed Dec. 14, 2023 to Final Office Action mailed Oct. 16, 2023", 12 pgs.
"U.S. Appl. No. 18/299,977, Non Final Office Action mailed Jun. 18, 2024", 29 pgs.
"U.S. Appl. No. 18/299,977, Non Final Office Action mailed Nov. 9, 2023", 14 pgs.
"U.S. Appl. No. 18/299,977, Response filed Mar. 11, 2024 to Non Final Office Action mailed Nov. 9, 2023", 10 pgs.

* cited by examiner

EYEWEAR WITH CONDUCTIVE TEMPLE JOINT

PRIORITY CLAIM

This application is a continuation of and claims the benefit of priority of U.S. patent application Ser. No. 16/790,971, filed on Feb. 14, 2020, which is a continuation of and claims the benefit of priority of U.S. patent application Ser. No. 15/949,852, filed on Apr. 10, 2018, which is a continuation of and claims the benefit of priority of U.S. patent application Ser. No. 15/642,878, filed on Jul. 6, 2017, which is a continuation of and claims the benefit of priority of U.S. patent application Ser. No. 14/869,149, filed on Sep. 29, 2015, each of which are hereby incorporated by reference herein in their entireties.

TECHNICAL FIELD

The subject matter disclosed herein generally relates to eyewear, and more specifically to electronics-enabled eyewear.

BACKGROUND

Eyewear, especially those carrying onboard electronics, can be bulky, making them difficult to wear and to transport when not being worn. These and other factors often cause electronically-enabled eyewear to be unwieldy and less than desirable to wear or transport.

BRIEF DESCRIPTION OF THE DRAWINGS

The present disclosure is illustrated by way of example, and not by way of limitation, in the figures of the accompanying drawings, in which.

OVERVIEW

A brief overview of some aspects of the disclosure with reference to selected drawings follows, after which various features of the disclosed subject matter will be described in greater detail.

Figure 1A:
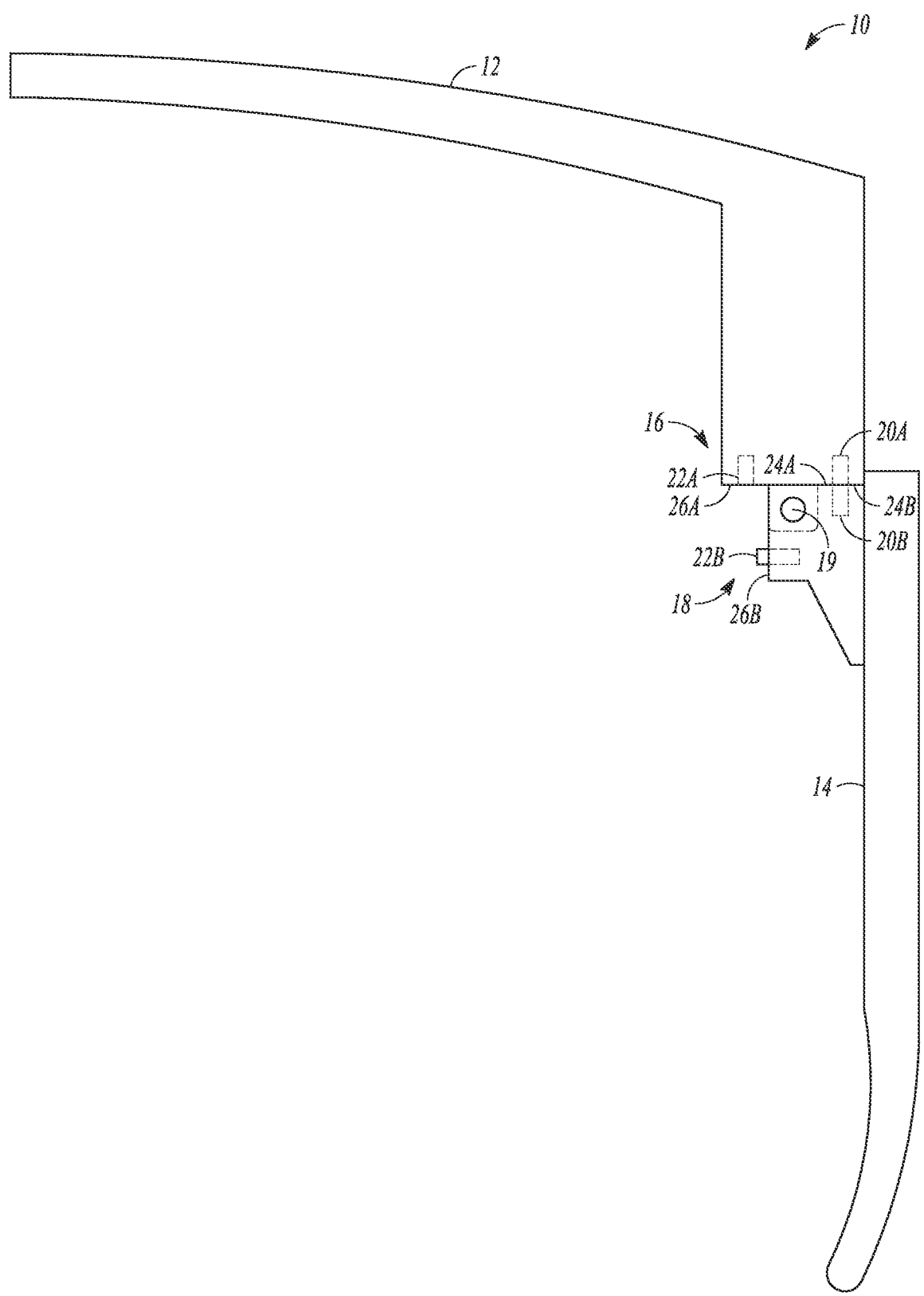
FIG. 1A is a plan view of a portion of eyewear including a temple and a frame mechanically coupled together by a hinge joint assembly with the temple disposed in a wearable position relative to the frame according to one embodiment.
Figure 1B:
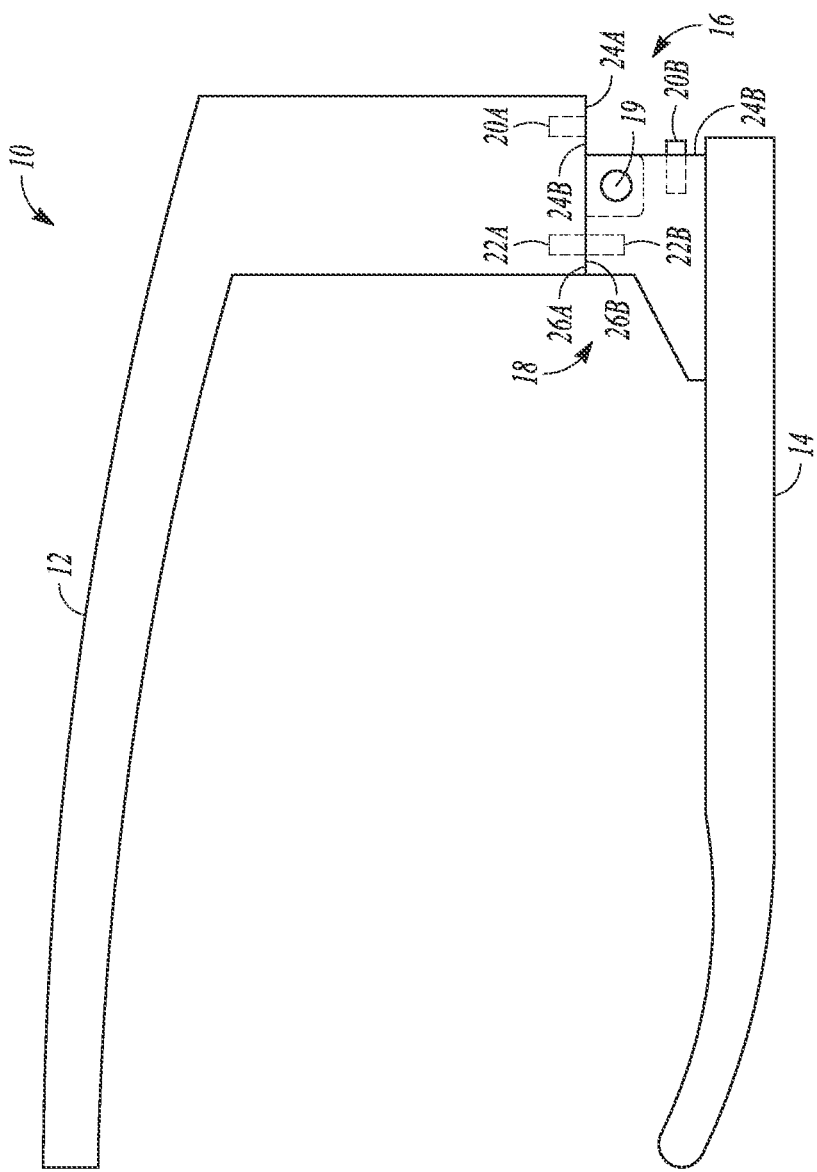
FIG. 1B is a plan view of the eyewear including the temple and the frame coupled together by the hinge joint assembly with the temple disposed in a folded storage position according to one embodiment.

One aspect of this disclosure is an eyewear article with onboard electronics, the eyewear article includes a conductive coupling mechanism (e.g., an interface or port) that allows power from a battery in the temple to be provided to the onboard electronics in the frame when the temple is in a wearable configuration (e.g., FIG. 1A) and when the eyewear article is in a folded or collapsed configuration (e.g., FIG. 1B). Such configuration allows the onboard electronics to be supplied with power in either the wearable configuration and folded configuration. This allows the eyewear article to be operable even in the folded configuration such as to run software and perform other tasks that can improve efficient and performance thereby improving the user experience.

Figure 5:
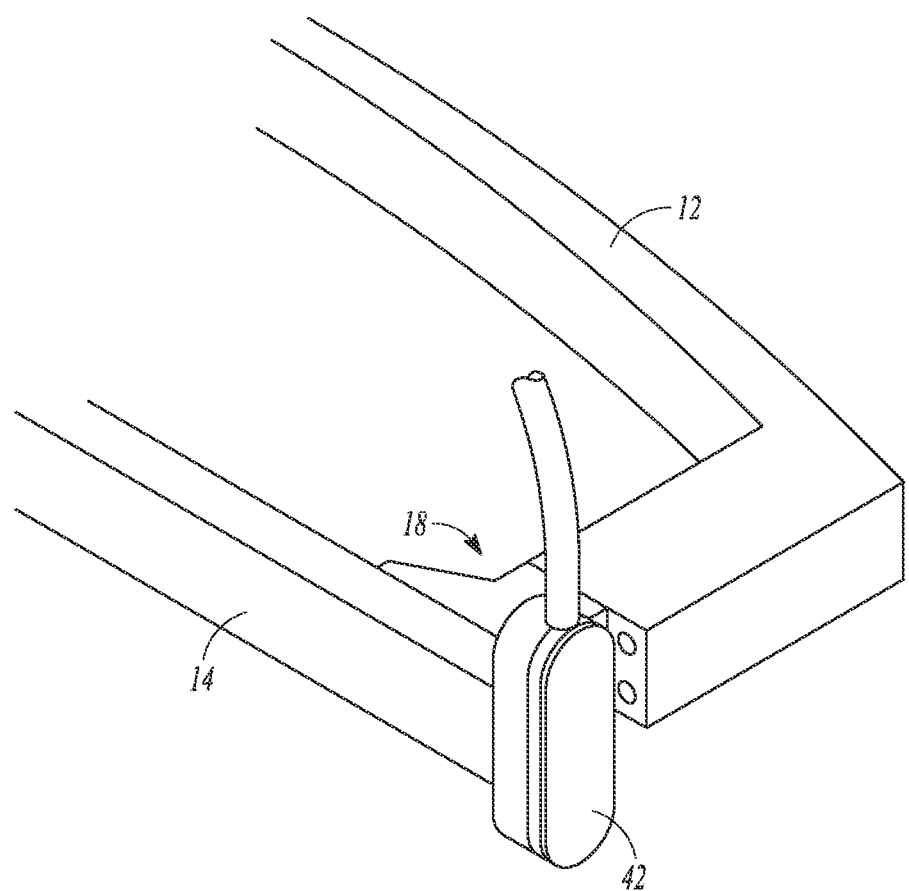
FIG. 5 is a perspective view of the portion of the frame of the eyewear of FIGS. 3 and 4 showing a portion of a charger mounted to the temple and electrically coupled to the conductive coupling mechanism on the temple according to an example embodiment.
Figure 8A:
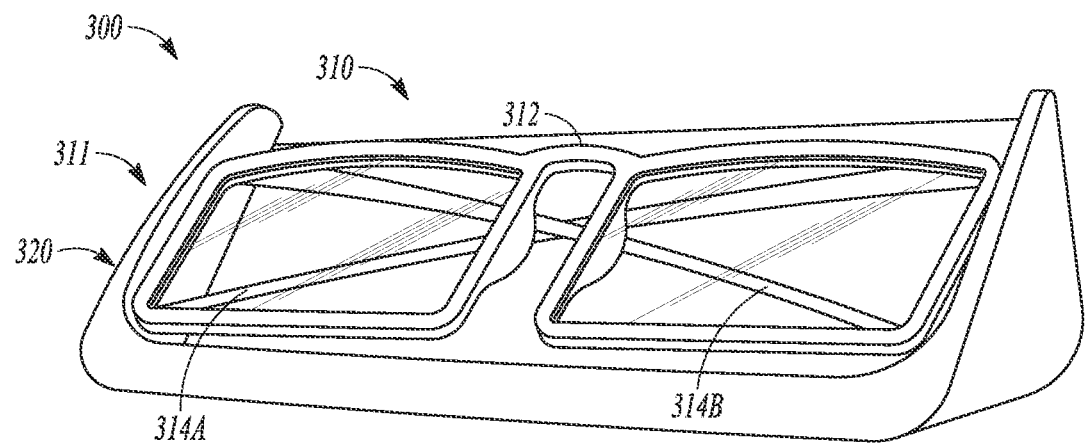
FIG. 8A is a front perspective view of a system including eyewear and a case according to one embodiment.
Figure 8B:
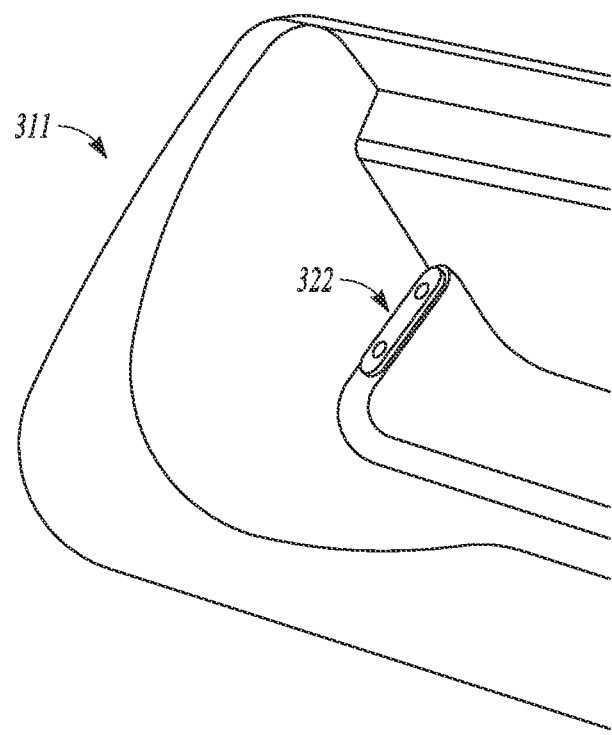
FIG. 8B is an enlargement of an interior portion of a case from FIG. 8 illustrating a conductive coupling mechanism can be used within the case that is adapted to mate with the conductive coupling mechanism of the temple according to an example embodiment.

According to further aspects the conductive coupling mechanism of the temple can be configured to interface with and receive charge from an external power source (e.g., a case as shown in FIGS. 8 and 8A, a personal computer, or an outlet via a charger as shown in FIG. 5) when the eyewear article is in the folded or collapsed configuration. Such conductive coupling mechanism can be used for recharging of the battery of the eyewear article, for example. In some embodiments, the conductive coupling mechanism may include a data component for transmitting data signals, enabling information upload and/or download between the external source (e.g., a personal computer) and the eyewear article or between components of the eyewear article (e.g., the temple and the frame).

For ease of description, the article of eyewear is further in this overview and description referred to as smart glasses. The electrically conductive coupling mechanism may comprise any suitable connector configured for contact and coupling with a complementary connector to establish an electrical and/or electronic link, including for example a port, a link, a socket, a plug, a cord, a contact pin, a contact pad, micro-USB, or the like. Although referred to herein as an electrically conductive coupling mechanism, in some cases the electrically conductive coupling mechanism can facilitate the transfer of both data and charge.

The smart glasses may have a body comprising the lens-carrying frame and a pair of the temples hingedly mounted on opposite ends of the frame. The smart glasses are in such cases in the wearable configuration or mode when at least one of both temples are substantially fully unfolded for reception along a side of the user's head. In contrast, the smart glasses are in the folded condition when at least one of the temples is hingedly folded towards the frame sufficiently to create the conductive coupling mechanism between a battery in the temple and onboard electronics in the frame. The folded condition thus can include both a fully folded condition in which one or both of the temples are hinged fully inwardly towards the frame (e.g., FIG. 1B), and a partially folded condition. However, in some cases the partially folded condition can break the conductive coupling mechanism between the battery (or batteries) in the temple (s) and the onboard electronics in the frame such as to power off or restart the electronics.

In some embodiments, the conductive coupling mechanism extends across (e.g., is located at) an articulated hinge joint where one of the temples is hingedly connected to the frame. The conductive coupling mechanism may be located on several of the joint faces provided by the frame and the temple respectively, the joint faces being in face-to-face abutment when in the wearable condition (see e.g., faces 24A and 24B in FIG. 1A), and being in face-to-face abutment when in the folded condition (see, e.g., faces 26A and 26B in FIG. 1B). In other embodiments, dual conductive coupling mechanisms may be implemented one on each temple, with the conductive coupling mechanism on each temple. To facilitate conductive coupling mechanism, the temple and the frame may carry cooperating features such as pins and pads configured for automatic contact and coupling when the smart glasses are in either the wearing condition or the folded condition, to provide a conductive coupling mechanism (and in some cases a data connection) between electronics in the temple and electronics in the frame.

In some embodiments, electrical/electronic components may be carried both by the frame and at least one of the temples. In other embodiments, the battery will be carried by one or both of the temples while substantially all other electrical/electronic components (see, e.g., computer, sensors, camera, microphone, wireless module, and the like, of FIGS. 6A, 6B, and 7) are carried only by the frame. This allows for a slimmer frame that can be more desirable for the user to wear and easier for the user to transport.

DETAILED DESCRIPTION

The description that follows includes apparatuses, systems and techniques that embody illustrative examples of the disclosure. In the following description, for the purposes of explanation, numerous specific details are set forth in order to provide an understanding of various embodiments of the inventive subject matter. It will be evident, however, to those skilled in the art, that embodiments of the inventive subject matter maybe practiced without these specific details. In general, well-known structures and techniques are not necessarily shown in detail.

FIGS. 1A and 1B show an example embodiment of eyewear 10 comprising smart glasses from a position above the eyewear 10. As shown in the FIGS. 1A and 1B, the eyewear 10 includes a frame 12, a temple 14, a hinge joint assembly 16 and a conductive coupling mechanism 18. The conductive coupling mechanism 18 allows power from a battery (e.g., battery 24 in FIGS. 2A and 2B) in the temple 14 to be provided to the onboard electronics in the frame 12 when the temple is in the wearable configuration (e.g., FIG. 1A) and when the eyewear 10 is in a folded or collapsed configuration (e.g., FIG. 1B). It should be recognized that such arrangement can be reversed in some embodiments such that the battery can be carried by the frame 12 and the onboard electronics can be carried by the temple 14. Such configurations allow the onboard electronics to be supplied with power in either the wearable configuration and folded configuration. This allows the eyewear 10 to be operable not only in the wearable configuration but also in the folded configuration such as to run software and perform other tasks.

FIGS. 1A and 1B also illustrate that the hinge joint assembly 16 can be shared between the temple 14 and the frame 12 to couple the temple 14 to the frame 12. The hinge joint assembly 16 can include a pin connection 19 that can comprise a single pin or multiple pins with different connection points between the temple 14 and the frame 12. The hinge joint assembly 16 facilitates mechanical movement of the temple 14 relative to the frame 12 about the pin connection 19. Such movement can be between the wearable configuration/position of FIG. 1A and the collapsed folded configuration/position of FIG. 1B.

According to the embodiment of FIGS. 1A and 1B, the conductive coupling mechanism 18 can be incorporated in the articulated hinge joint assembly 16 and can be configured to electrically connect the battery with other onboard electronics across the hinge joint assembly 16. As shown in FIGS. 1A and 1B, the conductive coupling mechanism 18 can include a first connector 20A positioned on a first face 24A of frame 12 and a second connector 22A positioned on a second face 26A of the frame 12. At least one of the first or second portion 24A and/or 26A can comprise a portion of the hinge joint assembly 16 and/or can be disposed closely adjacent the hinge joint assembly 16. The conductive coupling mechanism 18 can also include a first connector 20B positioned on a first face 24B or portion of the temple 14 and a second connector 22B positioned on a second face 26B or portion of the temple 14. At least one of the first or second portion 24B and/or 26B can comprise a portion of the hinge joint assembly 16 and/or can be disposed closely adjacent the hinge joint assembly 16. First face 24A is configured to interface with first face 24B when the temple 14 is in the wearable position. Similarly, second face 26A is configured to interface with the second face 26B when the temple 14 is in the folded position.

The conductive coupling mechanism 18 can be configured for automatic contact and electrical coupling in both the wearable position (FIG. 1A) and the folded position (FIG. 1B). More particularly, the connectors 20A and 20B are designed to interface with and electrically couple with one another such that they are complementary in design (e.g., one comprises a pad and one a pin, etc.). Similarly, the connectors 22A and 22B are designed to interface with and electrically couple with one another such that they are complimentary in design. As shown in FIGS. 1A and 1B, the connectors 20A and 22A comprise contact pads, while the connectors 20B and 22B comprise contact pins. However, the arrangement can be reversed or another known connector, for example, a port, a link, a socket, a plug, a cord, a micro-USB, or the like can be utilized.

Figure 2A:
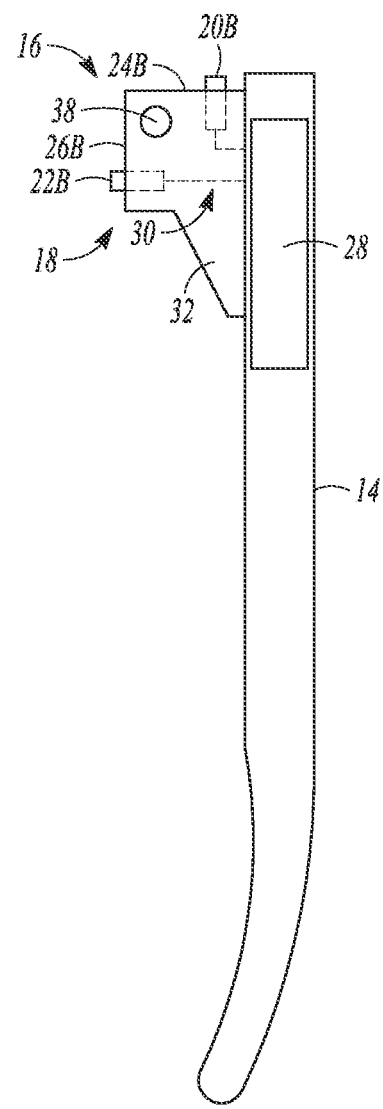
FIG. 2A is a plan view of a top face of the temple of FIGS. 1A and 1B showing an electrically conductive coupling mechanism and electronics such as a battery in phantom according to one embodiment.
Figure 2B:
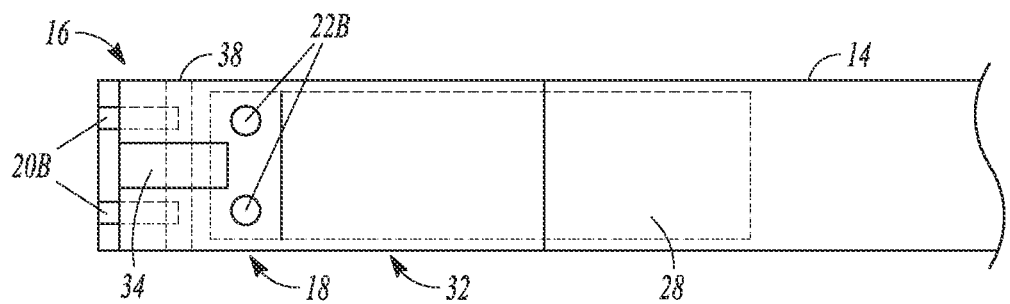
FIG. 2B is a plan view of a side face of a portion of the temple of FIG. 2A according to one embodiment.

FIGS. 2A and 2B show the temple 14 which can house a battery according to one embodiment. FIGS. 2A and 2B show the temple 14, a portion of the hinge joint assembly 16, and a portion of the conductive coupling mechanism 18 from various views. FIGS. 2A and 2B additionally illustrate that the temple 14 can be configured to house and carry battery 28 therein. The battery 28 can be configured to operationally store charge and a circuit 30 (FIG. 2A) can be coupled to the battery 28 and configured to deliver a charge to and from the battery 28. As discussed previously 28 the battery 28 can power electronics in the frame 12 (FIGS. 1A and 1B) when the temple 14 is in both the wearable configuration and the folded configuration.

FIGS. 2A and 2B show the features previously discussed including the first connector 20B, the second connector 22B, the first face 24B, and the second face 26B. FIGS. 2A and 2B additionally illustrate a projection portion 32 of the hinge joint assembly 16. The projection portion 32 forms the first and second faces 24B and 26B and includes a receptacle 34 (FIG. 2B) configured to receive a mating projection of the frame 12. The projection portion 32 of the temple 14 and the mating projection 36 (FIG. 3) of frame 12 can be connected together by pin connection 19 (FIGS. 1A and 1B), for example, which is received in an aperture 38 in the projection portion 32.

Figure 3:
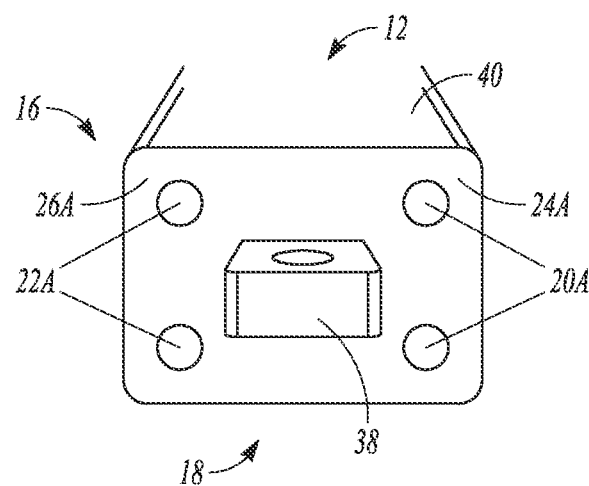
FIG. 3 is a perspective view of a portion of the frame of the eyewear of FIGS. 1A and 1B showing a portion of the hinge joint assembly and a portion of the conductive coupling mechanism on the frame according to one embodiment.

FIG. 3 shows a view of a portion of the frame 12, a portion of the hinge joint assembly 16, and a portion of the conductive coupling mechanism 18 with the temple removed. The conductive coupling mechanism 18 is disposed at or closely adjacent the hinge joint assembly 16 that connects the temple to the frame 12. FIG. 3 illustrates a portion 40 of the frame 12 having the hinge joint assembly 16 and the conductive coupling mechanism 18 mounted thereto. In particular, the portion 40 forms the first face 24A, the second face 26A, and the mating projection 38. As shown in FIG. 3, the connectors 20A and 22A can comprise contact pads that are disposed to interface at the first face 24A and the second face 26A. In particular, the connector 20A is disposed at the first face 24A and the connector 22A is disposed at the second face 26A in the embodiment of FIG. 3. As shown in FIG. 3, the first and second connectors 20A and 22A can be comprised of a pair contact pads, each pair comprising a negative pad and a positive pad that are electrically isolated from one another.

Figure 4:
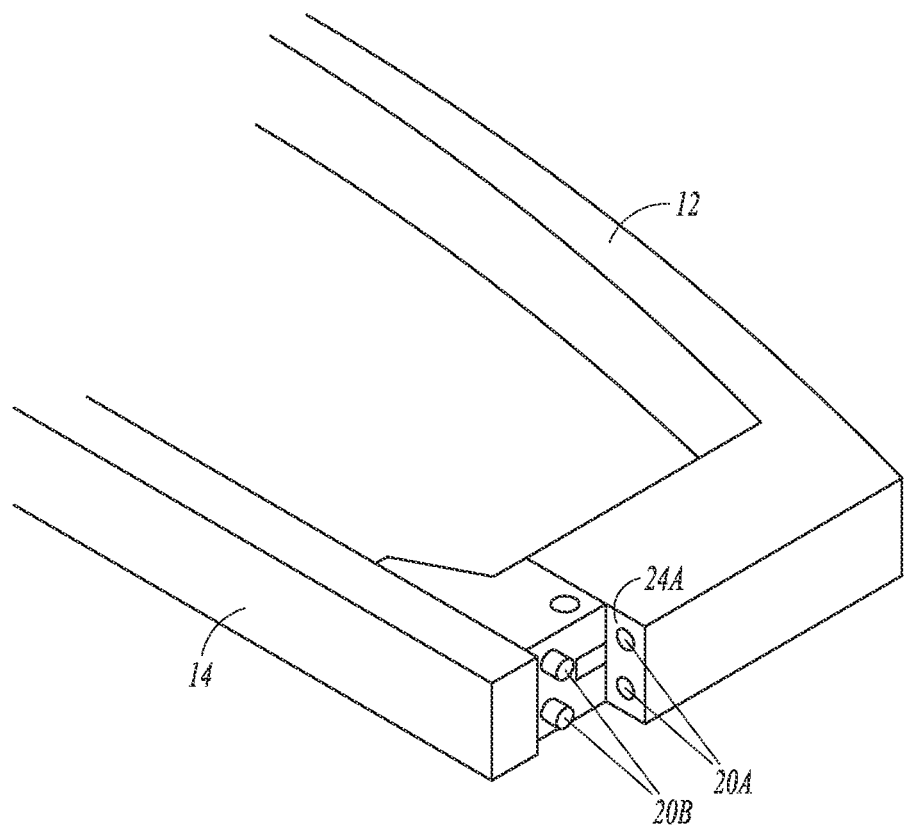
FIG. 4 is a perspective view of the portion of the frame of the eyewear of FIG. 3 showing the temple positioned in the folded storage position and showing a portion of the conductive coupling mechanism on the temple according to one embodiment.

FIG. 4 shows the temple 14 coupled to the frame 12 and moved to the folded position relative to the frame 12 such that connectors 22A and 22B (FIG. 3) come into contact as previously described with reference to FIG. 1B. This configuration creates an electrical connector that allows electrical charge from the battery (e.g., battery 28 in FIGS. 2A and 2B) carried by the temple 14 to pass to other electronics carried by the frame 12. Connectors 20A and 20B are exposed in the folded position allowing for coupling to an external power source as described subsequently in reference to FIGS. 5, 5A, 8, and 8A, for example. As shown in the embodiment of FIG. 4, each of the connectors 20B (and 22B not shown) can comprise a pair of connectors (e.g., positive and negative contact pins) that are configured to make contact with respective pads on the faces 24A and 26A (FIG. 3) of the frame 12.

FIG. 5 shows the conductive coupling mechanism 18 as well as the temple 14 and frame 12 can be configured for coupling with an external connector 42, which in turn, is electrically coupled to an external power source when the temple 14 is in the collapsed condition. The external power source can comprise a personal computer, an electrical outlet connected to the power grid, or another battery powered device, for example. The connector 42 can be configured to mount on the temple 14 and is configured to interface with and couple to the connectors 20B (FIG. 4) to allow the external power source to charge the battery (i.e. battery 28 in FIGS. 2A and 2B) carried by the temple 14.

Figure 5A:
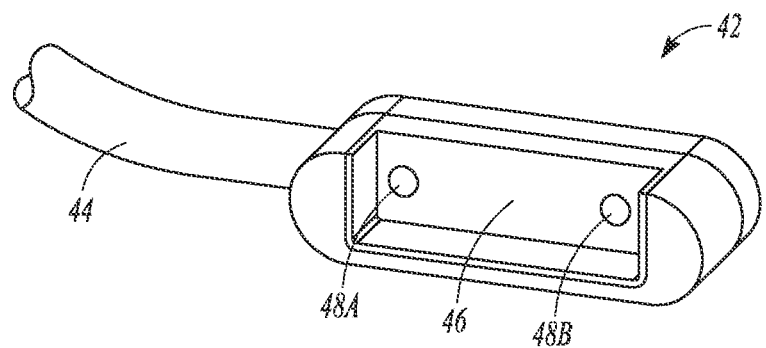
FIG. 5A is a perspective view of the charger of FIG. 5 according to an example embodiment.

FIG. 5A provides an example of the external connector 40 which includes a cord 44, a charging face 46, and pads 48A and 48B. In the example embodiment of FIG. 5A, the charging face 46 is recessed to facilitate mounting to an edge of the temple 14 as shown in FIG. 5. The pads 48A and 48B are configured to be complementary to with the pins (e.g., pins of FIG. 4) of connector 20B. In other embodiments, the pads 48A and 48B can be another connector type designed to be complimentary to the connector type used by the glasses 10. Cord 44 can be configured with a plug, USB or the like on a second end (not shown) to couple with an external power source (or data source) such as a personal computer or outlet.

Figure 6A:
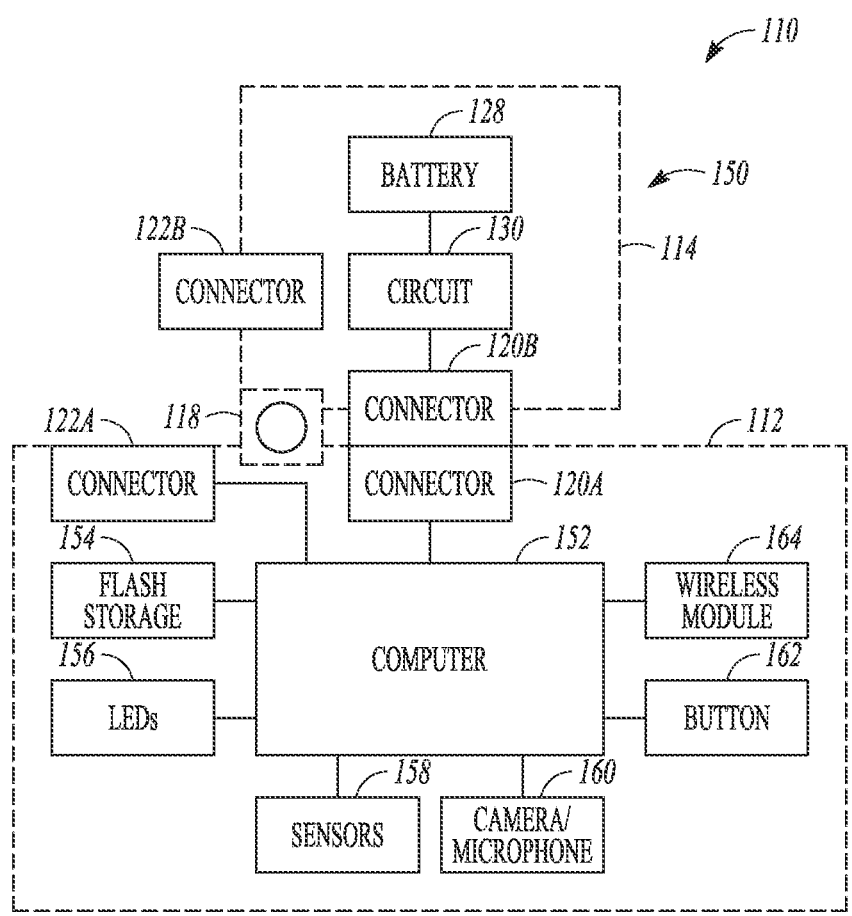
FIG. 6A is a schematic view eyewear comprising smart glasses with electronics carried by a temple and a frame, the temple positioned in a wearable position relative to the frame according to an example embodiment.
Figure 6B:
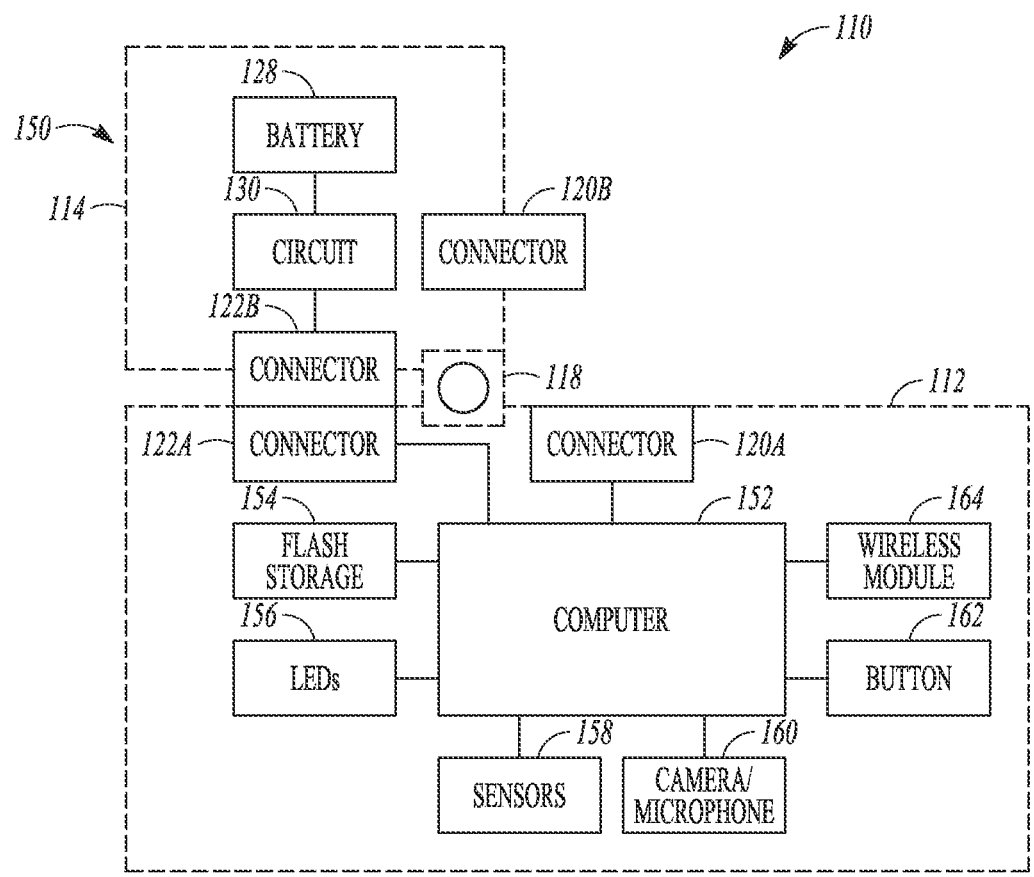
FIG. 6B is a schematic view of the smart glasses of FIG. 6A with the temple moved to a folded storage position relative to the frame according to an example embodiment.

FIGS. 6A and 6B are schematics of glasses 110 that incorporate various aspects of the eyewear previously discussed but may differ therefrom. For example, the glasses 110 can be configured to electrically couple in a first position (e.g., the wearable position as shown in FIG. 6A) and a second position (e.g., the folded position as shown in FIG. 6B). The glasses 110 can be constructed in a manner similar to glasses 10 previously discussed, and thus, can include two temples (only one temple 114 is illustrated in FIGS. 6A and 6B) and a frame 112. However, a conductive coupling mechanism 118 and a hinge joint assembly 116 of the glasses 110 can differ from those previously discussed with regard to specific embodiment of FIGS. 1A-5. According to the embodiment illustrated in FIGS. 6A and 6B, the glasses 110 comprise smart glasses which carry electronics 150.

The frame 112 and temple 114 can be provided with complimentary connectors 120A, 120B, 122A, 122B configured to electrically and physically couple with one another as generally illustrated. The connectors 120A, 120B, 122A, 122B can be disposed adjacent the hinge joint assembly 116 or can be incorporated into the hinge joint assembly 116. In some cases, the connectors 120A, 120B, 122A, 122B can be disposed at other portions of the frame 112 and temple 114 from the locations previously discussed with reference to FIGS. 1A-5.

The smart glasses 110 of FIGS. 6A and 6B can include various electronics 150. For example, the temple 114 can be configured to carry and/or house a battery 128 and a circuit 130, such as a protection circuit, in addition to the connectors 120B and 122B. The battery 128 is configured to operationally store charge. The circuit 130 is coupled to the battery 128 (and to the connectors 120B and 122) and is configured to deliver the charge to and from the battery 130.

The frame 112 can be configured to carry and/or house further electronics 150 such as a computer 152, a memory 154 (e.g., flash storage), a display 156 (e.g., LCD, LED, and the like), a sensor 158, a camera/microphone 160, a capture device 162 (e.g., a button), and a wireless module 164. Although not illustrated, the temple 114 and/or frame 112 can carry further electronics 150 in some instances such as further sensors, ancillary batteries, peripheral devices or other peripherals.

Many if not all of the electronics 150 run software and perform other tasks that require electrical charge from the battery 128. Thus, the ability to provide charge from the battery 128 to the electronics 150 carried by the frame 112 when the glasses are in the folded position (in addition to the wearable position) allows software and/or tasks to be performed even when the glasses are stowed. Therefore, performance of the glasses 110 and user experience can be improved as software can run and tasks can be performed even when the glasses are stowed. According to some examples, moving the temple 114 to the folded position can put the electronics 150 in low power mode of operation where sufficient power is provided to the electronics 150 such that software and other tasks can be performed by one or more of the electronic devices but excessive power is not utilized. Thus, battery life can be preserved even as software and tasks are performed when the glasses are in the folded position.

As shown in FIGS. 6A and 6B the connectors 120A, 120B and 122A, 122B, respectively are adapted to interface and couple together to form conductive coupling mechanism 118 capable of passing electrical charge. The computer 152 can be of any suitable type (e.g., make use of a low-power circuitry, high-speed circuitry, and/or a display processor) to be carried by the frame 112 and can communicate with the other electronics 150. The computer 152 can include one or more processors with memory, wireless communication modules and circuitry, a power source, and the like. Additional details of aspects of computer 152 may be implemented with use of the display 156, the sensor 158, the camera/microphone 160, the capture device 162 (e.g., a button), and/or other components or peripherals. Further aspects of the computer 152 may be implemented remotely via wireless, bluetooth, or the like.

Although described as a signal unit the camera/microphone 160 can comprise separate components or can be only a camera or only a microphone. The camera/microphone 160 can comprise multiple cameras and/or multiple microphones in some instances. The computer can be configured to communicate with and/or control various of the electronics 150 such as the display 156, the sensor 158, the capture device 162, the wireless module 164 and/or other peripheral devices. The electronics 150 can additionally include a video processor (not shown) such as a microprocessor integrated circuit (IC) customized for processing sensor data from the camera/microphone 160, along with volatile memory used by the microprocessor to operate. The memory 154 can comprise any suitable storage device capable of storing data generated by the electronics 150 including the camera/microphone 160. Memory can be integrated with high-speed circuitry, can be an independent standalone element, or can be remote or integrated into the glasses 110.

Figure 7A:
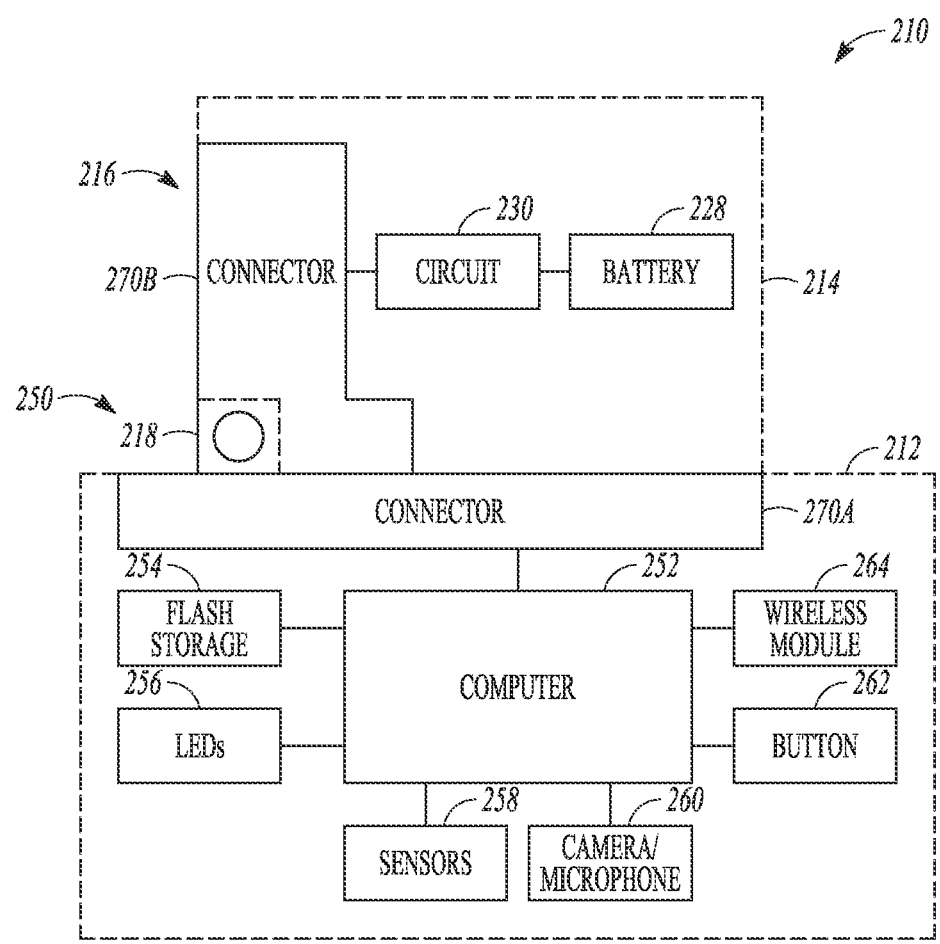
FIGS. 7A and 7B show alternative embodiments of the smart glasses with a single conductive coupling mechanism between the temple and the frame, with the single conductive coupling mechanism being part of a hinge joint assembly.
Figure 7B:
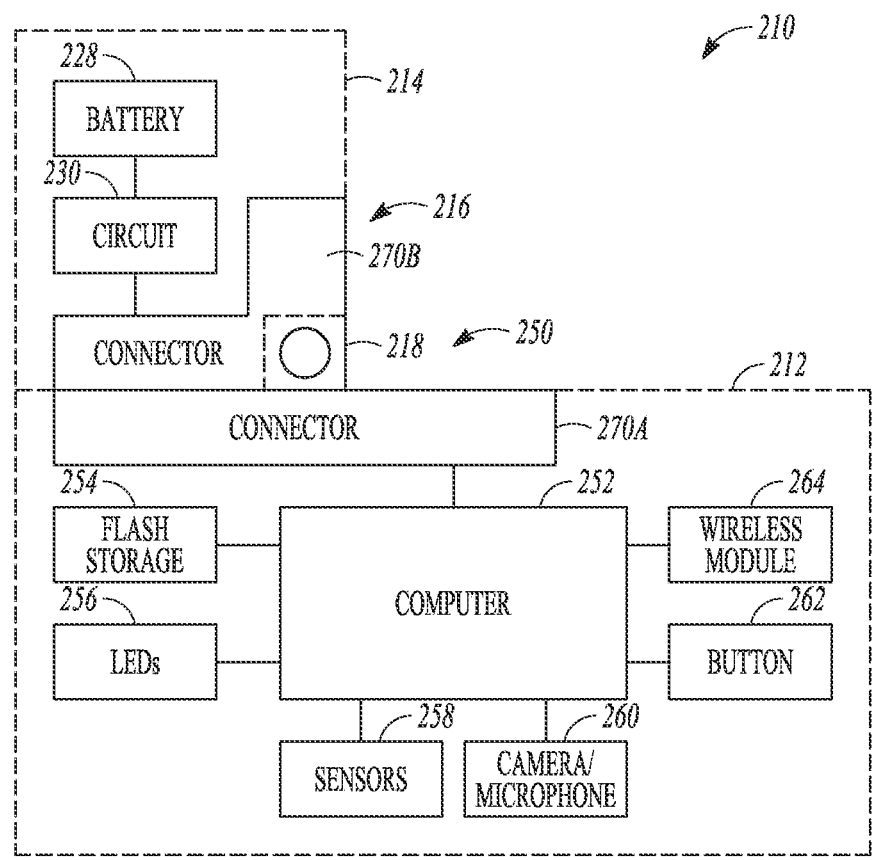

FIGS. 7A and 7B are schematics of glasses 210 that incorporate various aspects of the eyewear previously discussed including glasses 110. Therefore, the construction and components of glasses 210 will not be discussed in great detail. Similar to glasses 110, the glasses 210 include temples (only one temple 214 is illustrated in FIGS. 7A and 7B) and a frame 212. The temple 214 and frame 212 carry electronics 250 such as a battery 228, a circuit 230, a computer 252, a memory 254 (e.g., flash storage), a display 256 (e.g., LCD, LED, and the like), a sensor 258, a camera/microphone 260, a capture device 262 (e.g., a button), and a wireless module 264. The electronics 250 can be connected and operate in the manner previously discussed.

FIGS. 7A and 7B illustrate a conductive coupling mechanism 218 that differs from the connectors discussed previously. The conductive coupling mechanism 218 can be incorporated into so as to be part of a hinge joint assembly 216 that mechanically couples the temple 214 to the frame 212. Additionally, the coupling mechanism 218 can comprise a connector 270A on the frame 212 and a connector 270B on the temple 214. The connector 270A is configured to be electrically coupled to the connector 270B in various different positions of the temple 214 relative to the frame 212. These positions include the wearable position of FIG. 7A, the folded position of FIG. 7B, and intermediate positions therebetween. Thus, the glasses 210 provide the ability to supply charge from the battery 228 to the electronics 250 carried by the frame 212 when the glasses are in various positions including the folded position as well as the wearable position. This allows software and/or tasks to be performed by the electronics 250 even when the glasses are stowed.

FIG. 8 illustrates a smart eyewear kit 300 including, for example, a pair of smart glasses 310 and a container or holder such as a case 311. As discussed with regard to previous embodiments, the glasses 310 can generally include a frame 312, temples 314A and 314B, and electronics (as illustrated and discussed in previous embodiments); the details of each will not be discussed in great detail as aspects of these items have been previously described. The case 311 and glasses 310 can include electrical connectors 320 (FIG. 8) in the example form of a base or internal connector 322 (FIG. 8A) or port on the case 311 and a corresponding connector (not shown) on the glasses 310.

As illustrated variously in FIGS. 8 and 8A, the glasses 310, the case 311 and a cable (e.g., external connector 42 of FIGS. 5 and 5A) can interact together in various ways and for various purposes. For example, the case 311 can be used to transport and protect the glasses 310, to charge or provide power to the electronics (including the battery housed in the temple 314A) incorporated in the glasses 310, and/or to communicate with the electronics of the glasses 310. Thus, in some embodiments the case 311 can house a supplemental battery to those of the glasses 310. Thus, the case 311 can be an external source of power for the glasses 310.

The internal connector 322 of the case 311 is configured to couple to a corresponding connector of the glasses 310 (e.g., in a manner previously described such as in reference to FIGS. 5 and 5A) for power and/or data communication when the temples 314A and 314B are in a folded position and docked in the case 311. As such, the interior of the case 311 can be shaped to receive the glasses 310 only when the temples 314A and 314B are in the folded position. The shape of the interior also can be such that the connector (e.g., connector 20B) of the glasses 310 interfaces directly with the internal connector 322 when the glasses are docked in the case 311 with little slippage or movement occurring between the case 311 and the glasses 312. Although illustrated as pogo pin/pad connectors, the connectors can be of virtually any type known in the art for power and/or data communication such as micro-USB, or the like.

FIG. 8A illustrates the internal connector 322 disposed in the interior of the case 311. The interior of the case 311 is configured to dispose the connector of the temple 314A (FIG. 8) of the eyewear 312 to interface with and couple with the internal connector 322. As illustrated, the internal connector 322 comprises a pad type connector design to interface with pogo pins on the temple 314A although other types of connectors such as micro-USB are anticipated.

Figure 9:
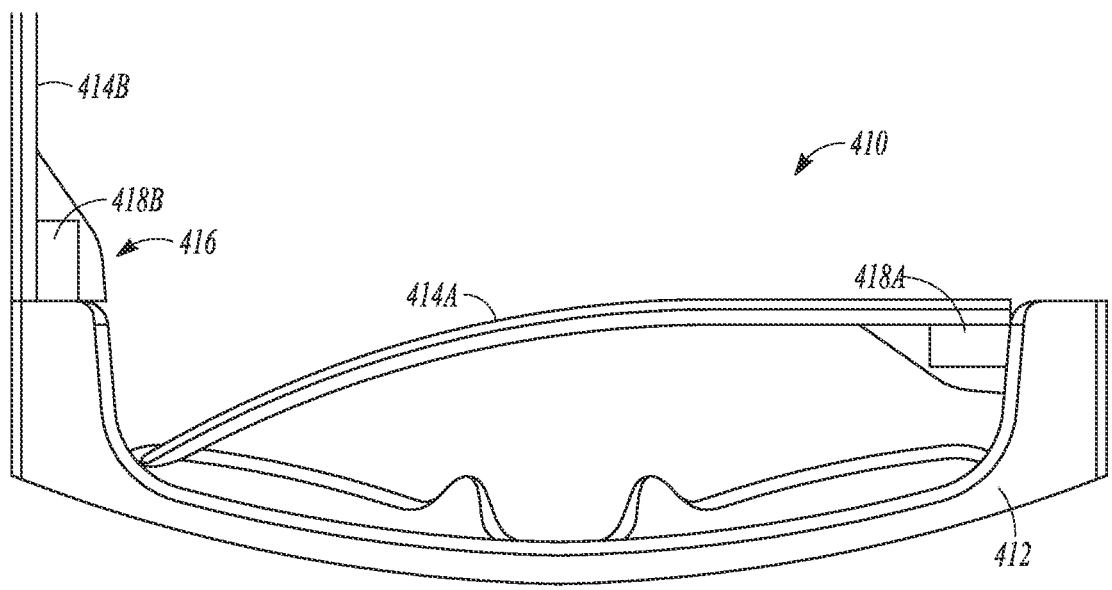
FIG. 9 shows smart glasses according to another example embodiment that includes a battery in each temple.

FIG. 9 shows smart glasses 410 according to another example embodiment. As discussed with regard to previous embodiments, the glasses 410 can generally include a frame 412, temples 414A and 414B, and electronics (as illustrated and discussed in previous embodiments); the details of each will not be discussed in great detail as aspects of these items have been previously described.

The glasses 410 of the embodiment of FIG. 9 have electronics 416 that include a first battery 418A and a second battery 418B. The first battery 418A is housed in and carried by the first temple 414A and the second battery 418B is housed in and carried by the second temple 414B. Similar to previously discussed embodiments, the glasses 410 can include a conductive coupling mechanism (e.g., an interface or port) incorporated into the joint between each temple 414A and 414B and the frame 412 that allows power from the batteries 418A and 418B to be provided to the onboard electronics in the frame 412 when the temples 414A and 414B are in a wearable configuration (i.e. the position of temple 414B) and when the eyewear article is in a folded or collapsed configuration (i.e., the position of temple 414A). Power can be drawn from each battery 418A and 418B in substantially equal amounts (e.g., in parallel) and at substantially the same time in some embodiments. In other embodiments, the second battery 418B can be used as a reserve battery and can provide power to the electronics when power provided by the first battery 418A becomes lower than desired. In yet further embodiments, the first battery 418A can provide power to the electronics when in the wearable configuration and the second battery 418B can provide power to the electronics in the folded or collapsed configuration.

[Examples to be added here upon approval of claims] Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A wearable device comprising:
   a frame configured to hold one or more optical elements;
   a temple;
   an articulated joint connecting the temple to the frame such that the temple is disposable between a collapsed condition and a wearable condition in which the wearable device is wearable by a user to hold the one or more optical elements within user view;
   one or more onboard electronics components comprising at least a pair of electronics components carried by the frame and the temple, respectively; and
   a coupling mechanism adjacent the articulated joint, the coupling mechanism is configured to electrically connect the pair of electronics components across the articulated joint both when the temple is in the wearable condition and when the temple is in the collapsed condition, wherein the coupling mechanism includes an electrical connector adjacent the articulated joint and positioned to be covered by the temple so as to be inaccessible to facilitate charging with the temple in the wearable condition, the electrical connector exposed to facilitate charging of the one or more onboard electronics components when the temple is positioned in the collapsed condition.

2. The wearable device of claim 1, wherein the coupling mechanism includes a first electrical connector and a second electrical connector spaced from the first electrical connector across the articulated joint, wherein via the second electrical connector the one or more onboard electronics components are operable and supplied with power when the temple is positioned in the collapsed condition.

3. The wearable device of claim 2, further comprising a charging device configured to couple to at least one of the first electrical connector or the second electrical connector when the temple is position in the collapsed condition.

4. The wearable device of claim 1, wherein via the coupling mechanism the one or more onboard electronics components are operable and supplied with power when the temple is positioned in the collapsed condition.

5. The wearable device of claim 1, wherein the coupling mechanism includes a first electrical connector and a second electrical connector, wherein at least the second electrical connector is between the temple and the frame, wherein the second electrical connector is configured to create a second electrical connection between the temple and the frame when the temple is positioned in the wearable condition.

6. The wearable device of claim 5, wherein via the second electrical connector the one or more onboard electronics components are operable and supplied with power from a battery in the temple.

7. The wearable device of claim 1, further comprising a case configured to receive the wearable device therein with the temple positioned in the collapsed condition, the case configured to transfer power from the case to the one or more onboard electronics components.

8. The wearable device of claim 1, wherein the one or more onboard electronics components comprise a battery and the coupling mechanism facilitates power transfer between the battery and another of the one or more onboard electronics components carried by the wearable device.

9. The wearable device of claim 1, wherein the coupling mechanism includes at least two electrical ports on the temple and at least two electrical ports on the frame.

10. A method of operating a wearable device, comprising:
providing a frame and a temple connected to the frame, wherein at least the frame is configured to carry one or more onboard electronics components and optical elements for a user;
articulating the temple relative to the frame from a wearable condition in which the wearable device is wearable by the user to a collapsed condition; and
supplying power to the one or more onboard electronics components via an electrical connector, wherein the electrical connector is exposed with the temple in both the wearable condition and the collapsed condition.

11. The method of claim 10, wherein a first portion of the electrical connector is covered by the temple in the wearable condition and a second portion of the electrical connector is covered by the temple in the collapsed condition.

12. The method of claim 10, wherein the electrical connector includes a first electrical connector and a second electrical connector spaced from the electrical connector across an articulated joint, wherein via the second electrical connector the one or more onboard electronics components are operable and supplied with power when the temple is in the collapsed condition.

13. The method of claim 10, further comprising operating the one or more onboard electronics components when the temple is positioned in the collapsed condition and the wearable condition.

14. The method of claim 10, wherein supplying power to the one or more onboard electronics components comprises seating the wearable device within a case with the temple in the collapsed condition.

15. The method of claim 10, wherein the electrical connector includes at least two ports on a first part of the temple and at least two ports on a second part of the temple.

16. The method of claim 15, wherein the electrical connector includes at least two pads on the frame on a first part of the frame and at least two ports on a second part of the frame.

17. A method of operating a wearable device, comprising:
providing a frame and a temple connected to the frame, wherein at least the frame is configured to carry one or more onboard electronics components and optical elements for a user;
articulating the temple relative to the frame from a wearable condition in which the wearable device is wearable by the user to a collapsed condition;
disconnecting a power supply to the one or more onboard electronics components when the temple is articulated between the wearable condition and the collapsed condition; and
supplying power from the power supply to the one or more onboard electronics component when the temple is in the wearable condition and the collapsed condition.

18. The method of claim 17, further comprising supplying power to the one or more onboard electronics components via an electrical connector, wherein the electrical connector is exposed with the temple in both the wearable condition and the collapsed condition.

* * * * *